(12) United States Patent
Nishigaki et al.

(10) Patent No.: US 10,006,837 B2
(45) Date of Patent: Jun. 26, 2018

(54) SEATING POSTURE MANNEQUIN AND METHOD FOR OBTAINING INFORMATION FOR EVALUATING SEAT

(71) Applicant: TOYOTA BOSHOKU KABUSHIKI KAISHA, Aichi-ken (JP)

(72) Inventors: Yoshiomi Nishigaki, Aichi-ken (JP); Kenji Kawano, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 14 days.

(21) Appl. No.: 15/046,157

(22) Filed: Feb. 17, 2016

(65) Prior Publication Data

US 2016/0245726 A1 Aug. 25, 2016

(30) Foreign Application Priority Data

Feb. 19, 2015 (JP) .................................. 2015-030304

(51) Int. Cl.
*G01M 99/00* (2011.01)
*G09B 23/32* (2006.01)

(52) U.S. Cl.
CPC ........... *G01M 99/001* (2013.01); *G09B 23/32* (2013.01)

(58) Field of Classification Search
CPC .............................. G01M 99/001; G09B 23/32
USPC ......................................................... 73/866.4
See application file for complete search history.

(56) References Cited

U.S. PATENT DOCUMENTS

| 4,669,302 A * | 6/1987 | Wagner ................. A47C 31/123 73/172 |
| 5,394,766 A * | 3/1995 | Johnson .................... B25J 9/148 40/414 |
| 6,131,436 A * | 10/2000 | O'Bannon ................ B25J 11/00 73/7 |
| 6,206,703 B1 * | 3/2001 | O'Bannon ........ G01M 17/0078 434/267 |
| 2009/0025492 A1 * | 1/2009 | Hwang ................... G09B 23/32 73/866.4 |
| 2009/0056481 A1 * | 3/2009 | Hwang ................... G09B 23/32 73/866.4 |
| 2009/0151444 A1 * | 6/2009 | Kim ..................... G01M 99/001 73/172 |

FOREIGN PATENT DOCUMENTS

| JP | 2013-257287 | 12/2013 |
| JP | 2014-61161 | 4/2014 |

* cited by examiner

*Primary Examiner* — Peter Macchiarolo
*Assistant Examiner* — Alexander Mercado
(74) *Attorney, Agent, or Firm* — Greenblum & Bernstein, P.L.C.

(57) ABSTRACT

A seating posture mannequin configured to be used for evaluating a seat, the seating posture mannequin including: a pelvic part configured to be placed on a seat cushion; a chest part configured to be disposed at a position facing a seat back, wherein a relative position between the chest part and the pelvic part can be changed; a slope adjustment device configured to change a slope of the chest part; and a processing device configured to control the slope adjustment device by using a result detected by a detector.

8 Claims, 4 Drawing Sheets

SEATING POSTURE MANNEQUIN AND METHOD FOR OBTAINING INFORMATION FOR EVALUATING SEAT

CROSS-REFERENCE TO RELATED APPLICATIONS

This application claims priority from Japanese Patent Application No. 2015-030304 filed on Feb. 19, 2015, the entire contents of which are incorporated herein by reference.

TECHNICAL FIELD

Aspects of the present invention relate to a seating posture mannequin and a method for obtaining information for evaluating a seat. Particularly, the present invention relates to a seating posture mannequin used for confirming a seating state on a seat.

BACKGROUND

There has been widely used a seat that has a seat cushion serving as a seat (stool) when a person is seated and a seat back serving as a backrest when a person is seated. It is known to collect information showing a relationship between a vehicle and a behavior of a human body during vehicle collision by mounting a mannequin on a vehicle including such seat (see JP-A-2013-257287). In the mannequin disclosed in JP-A-2013-257287, it is possible to reproduce the typical behavior of the human body during vehicle collision by reproducing one typical body shape. Therefore, various information during vehicle collision can be collected by using this mannequin.

Unlike such information during vehicle collision, there has been developed a mannequin that is used for collecting information serving as an index of the comfort of the seat (see US-A1-2009/0025492 and JP-A-2014-61161). The mannequin disclosed in US-A1-2009/0025492 is a mannequin where the position of the spinal column can be adjusted. In this mannequin, a rod is disposed between a shoulder and a pelvis and the movement range of the spinal column is restricted. The mannequin disclosed in JP-A-2014-61161 is made in consideration of the fact that there are personal differences in the comfortable posture. This mannequin is configured so that a plurality of types of comfortable postures can be expressed by changing the setting of one mannequin. When the characteristics of each individual's desired posture and the shape of the seat are not suited, this condition is reflected to the seating pressure distribution or the posture. Therefore, the information relating to this condition is collected and the collected information can be used as the material for examining the comfort or the like of the seat. As disclosed in JP-A-2014-61161, the mannequin used for collecting such information is configured so that the shape of the mannequin follows the shape of the seat to some extent.

The mannequin disclosed in JP-A-2013-257287 is not intended to be used for examining the comfort or the like of the seat. Therefore, although the shape of the mannequin placed on the seat can be changed in accordance with the shape of the seat, the mannequin is not configured so that it can perform the adjustment to maintain the comfortable posture. Since the mannequin disclosed in US-A1-2009/0025492 is configured so that a shoulder and a pelvis are fixed by a rod, a pelvic part and a chest part are not configured so as to be relatively movable. The mannequin disclosed in JP-A-2014-61161 is intended to be used for examining the comfort or the like of the seat. Therefore, this mannequin is configured so that it is deformable so as to lean against the seat. This mannequin is intended to be used in the state where the portion corresponding to the vicinity of the thorax of the human body leans against the seat back. Therefore, when a portion of a lumbar spine is bent, and thus, the chest part is spaced away from the seat back, an upper body of the mannequin may fall toward a thigh part, as indicated by a two-dot chain line in FIG. 2. Although there is no problem in this configuration in a case where the chest part of the mannequin leans against the seat back, the seating posture of the human body may be different from this posture. For example, in order to reduce the burden for maintaining the head part, it is conceivable for a seating person to sit on the seat in such a way that the vicinity of the thorax is not abutted against the seat back but only the vicinity of the pelvis of the seating person is abutted against the seat back. In the mannequin disclosed in JP-A-2014-61161, it is difficult to express such seating posture.

SUMMARY

Aspects of the present invention have been made in view of the above situations and an object thereof is to provide a seating posture mannequin in which a pelvic part and a chest part are relatively movably connected to each other and which is capable of expressing a seating posture where the chest part does not lean against a seat back.

According to an aspect of the present invention, there is provided a seating posture mannequin configured to be used for evaluating a seat, the seating posture mannequin including: a pelvic part configured to be placed on a seat cushion; a chest part configured to be disposed at a position facing a seat back, wherein a relative position between the chest part and the pelvic part can be changed; a slope adjustment device configured to change a slope of the chest part; and a processing device configured to control the slope adjustment device by using a result detected by a detector.

According to another aspect of the present invention, there is provided a method for obtaining information for evaluating a seat by seating a seating posture mannequin, in which a pelvic part and a chest part are relatively movably connected to each other, on the seat, the method including: performing calculation by using a result detected by a detector; adjusting a slope of the chest part of the seating posture mannequin by controlling a slope adjuster based on the result of the calculation; and obtaining the information for evaluating the seat.

DETAILED DESCRIPTION

Figure 1:
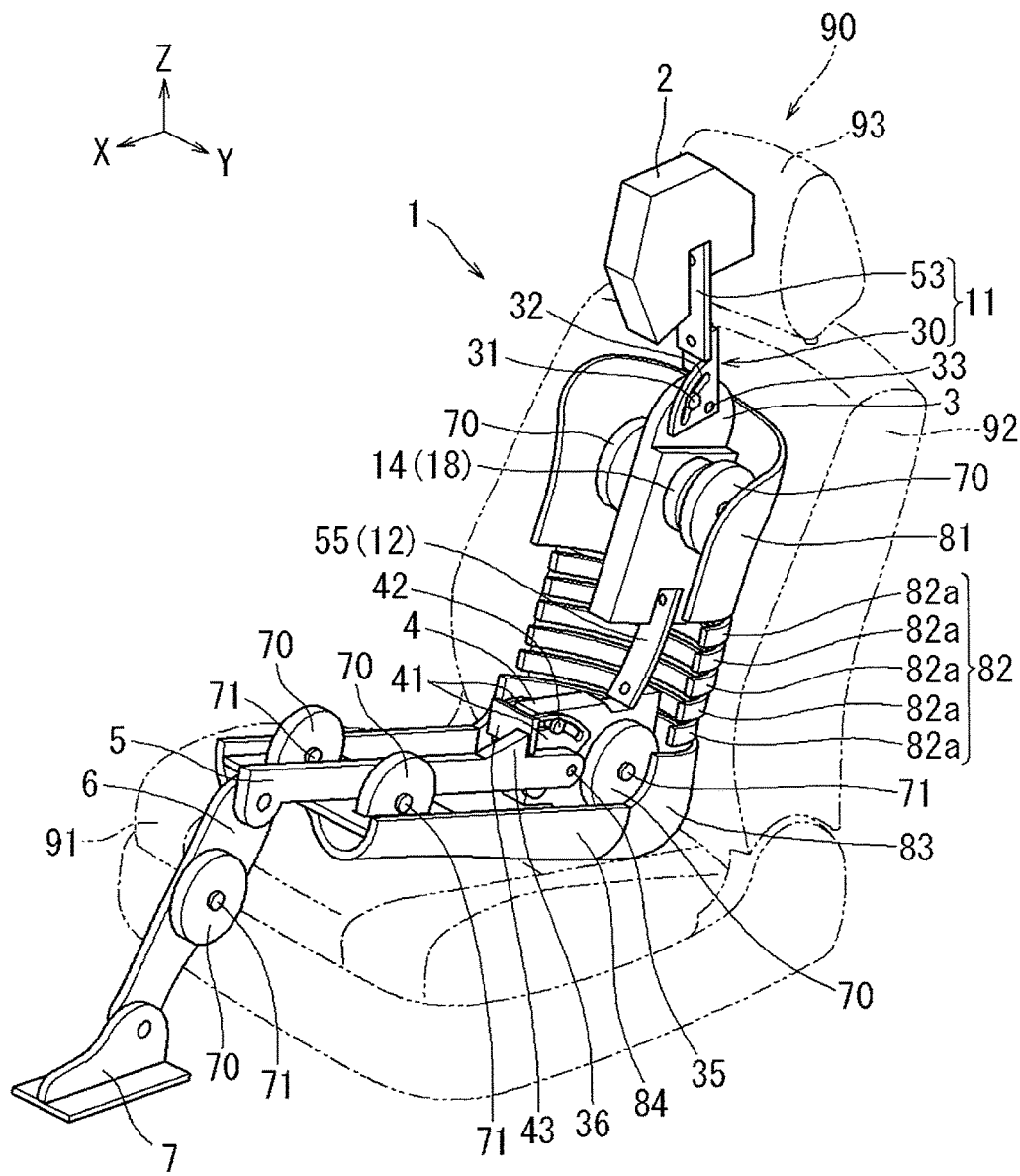
FIG. 1 is a perspective view showing a state where a seating posture mannequin according to an illustrative embodiment is seated on a seat in a normal seating state.

Hereinafter, an illustrative embodiment for carrying out the present invention will be described with reference to the drawings. Meanwhile, in the present specification, the direction indications such as an upper-lower direction and a front-rear direction represent directions of a seating posture mannequin 1 in a normal seating state. Namely, in FIG. 1, a direction indicated by X is a front side, a direction indicated by Y is a left side, and a direction indicated by Z is an upper side.

Embodiment

The seating posture mannequin 1 according to the illustrative embodiment is the seating posture mannequin 1 for showing a seating posture when a human body is seated on a vehicle seat 90. The seating posture mannequin 1 includes a pelvic part 4 and a chest part 3. The pelvic part 4 can be placed on a seat cushion 91. The chest part 3 can be relatively movably connected to the pelvic part 4 and can be placed at a position facing an upper portion of a seat back 92. Further, the seating posture mannequin 1 includes a slope adjustment device 18 capable of changing the slope of the chest part 3. The slope adjustment device 18 is configured so as to adjust the chest part 3 based on the result detected by a detector 61.

FIG. 1 shows a state where the seating posture mannequin 1 of an illustrative embodiment, to which the present invention is applied, is seated on the seat 90 having the seat cushion 91, the seat back 92 and a headrest 93. It is noted that a portion of a lumbar cover 82 is omitted.

The seating posture mannequin 1 is a mannequin which is used for reproducing a seating posture when being seated on the seat 90. Therefore, the chest part 3 and the pelvic part 4 are connected to each other so as to be relatively displaceable. Further, the seating posture mannequin 1 of the present embodiment is a mannequin that can express a plurality of types of human bodies by one mannequin. More particularly, the seating posture mannequin 1 is a mannequin that can express a personal difference by setting an angle between a head part 2 and the chest part 3. Further, the seating posture mannequin 1 is a mannequin that can change an allowable range of an angle between a thigh part 5 and the pelvic part 4.

Now, the reason for enabling a relative angle between the head part 2 and the chest part 3 of the seating posture mannequin 1 to be regulated will be described. A head part of a human body is connected to a chest part by a cervical part and the muscles around it. Although connected to each other, a relative position between the head part and the chest part is not intended to be solely defined, but has some degree of freedom. By the way, when the relative position between the head part and the chest part is changed, a force for supporting the weight of the head part by muscular strength around a neck part is changed. This means that a state where the muscular strength around the neck part is almost not used (hereinafter, referred to as "head comfortable state") is obtained when the relative position between the head part and the chest part is in a specific position. The head comfortable state refers to a state where a body is naturally balanced when one's strength is gone in a gravity-free state. Further, this naturally balanced state is different from person to person. The difference appears as a difference in the relative angle between the head part and the chest part. In the present specification, the relative angle between the head part and the chest part in the head comfortable state is defined as a neck attaching angle.

The expression that the neck attaching angle is different from person to person means that the relative position (relative angle) between the neck part and the chest part for achieving the state where the muscular strength around the neck part is almost not used is different from person to person. In order to allow the seating posture mannequin 1 to express such difference, the present embodiment adopts a configuration that a spring member and a neck attaching angle adjustment mechanism 30 are disposed in series.

Next, the reason for enabling a relative angle between the pelvic part 4 and the thigh part 5 of the seating posture mannequin 1 to be regulated will be described. As a relative angle between a pelvic part and a thigh part of a human body is narrowed, human feels discomfort. The reason is that the elongation of each muscle located behind the buttocks or the thigh part exceeds an allowable value. The allowable value for the elongation of each muscle is different from person to person. That is, the allowable value of the relative angle between the pelvic part and the thigh part is different from person to person. In the present invention, the allowable value of the relative angle between the pelvic part and the thigh part is defined as an "L-hip angle."

The expression that the L-hip angle is different from person to person means that there occurs a difference in the orientation of the pelvic part relative to the seat cushion 91 in the seating state. From the difference in the orientation of the pelvic part, there occurs a difference in the bending form of the lumbar connected to the pelvic part. In order to allow the seating posture mannequin 1 to express such difference, the present embodiment adopts a configuration that the chest part 3 and the pelvic part 4 are connected by a spring member and the relative angle between the pelvic part 4 and the thigh part 5 can be adjusted.

Next, an overall image of the seating posture mannequin 1 of the present embodiment will be described. The seating posture mannequin 1 is formed by connecting a plurality of main parts in series. The main parts are formed by a rigid body or an elastic body. The portions connecting the rigid bodies to each other are connected so as to be mutually pivotable. The portions connecting the rigid body and the elastic body are closely fixed to each other. In the present embodiment, the head part 2, the chest part 3, the pelvic part 4, the thigh part 5, a shin part 6, and a foot part 7 are provided as the rigid body. Further, a lumbar part 12 and a cervical part 11 are provided as the part having the elastic body. A spring member is preferably provided as the elastic body connected with the rigid body. In the present embodiment, a leaf spring is used.

The elastic body that forms the lumbar part 12 and the cervical part 11 is adapted to return to its original shape by an elastic force when deformed in a predetermined range. However, since the seating posture mannequin 1 is used to reproduce the seating posture, a properly deformable elastic body is selected as the lumbar part 12 or the like. Accordingly, when the chest part 3 located above the bent portions of the lumbar part 12 of the seating posture mannequin 1 is not in contact with the seat 90, the lumbar part 12 is bent so as to be curved forward. Therefore, there is a possibility that it is difficult to maintain the seating posture. For this reason, the seating posture mannequin 1 of the present embodiment includes a slope adjustment device 18 capable of adjusting an angle of the chest part 3. The slope adjustment device 18 is controlled to adjust the chest part 3 based on the detection result of the detector 61 located at a predetermined region.

The detector 61 is connected to an A/D converter 62 for converting an analog signal into a digital signal. The A/D converter 62 is connected to a computer that is a processing device 63 capable of performing calculation. The processing device 63 is also connected to a D/A converter 64 for converting a digital signal into an analog signal. The D/A converter 64 is connected to an amplifier 65. The amplifier 65 is connected to the slope adjustment device 18. The output of the slope adjustment device 18 is inputted to the A/D converter 62 and is used for the calculation in the processing device 63.

The detector 61 of the present embodiment employs a gyro sensor capable of detecting an angle or an angular velocity. Based on the results detected by the gyro sensor, an inertia rotor 14 used as the slope adjustment device 18 is operated. The inertia rotor 14 can generate a reaction torque by the rotation of a disc-shaped rotor. In the present embodiment, based on the detection results obtained by the gyro sensor, the rotation direction or rotation speed or the like of a rotor is determined by the processing device 63 and the direction or magnitude of the reaction torque is adjusted. The reaction torque is controlled such that the slope of the chest part 3 is maintained at a predetermined slope. In order to control the slope of the chest part 3, a feedback control is performed in the processing device 63.

For example, when it attempts to maintain the head comfortable state, it is conceivable to maintain an angle between the cervical part 11 and a vertical axis in a state of about zero degree. This example will be described hereinafter. In order to achieve the head comfortable state, the angle between the cervical part 11 and the vertical axis is detected by the gyro sensor. The detected results are subjected to the A/D conversion, and then, are inputted to the processing device 63. The results calculated by the processing device 63 are outputted to the D/A convertor 64. The signals passing through the D/A convertor 64 are amplified by the amplifier 65 and are transmitted to the slope adjustment device 18. Since the slope adjustment device 18 of the present embodiment is the inertia rotor 14, the rotation of the rotor is controlled by the signals passing through the amplifier 65. The reaction torque, which is generated by the rotation of the rotor operated by the signals transmitted to the inertia rotor 14, acts to change the slope of the chest part 3. At this time, the output of the inertia rotor 14 is subjected to the A/D conversion, and then, is inputted to the processing device 63. By repeating this series of operation, the angle of the chest part 3 is changed such that the angle between the cervical part 11 and the vertical axis is maintained at about zero degree. At this time, the chest part 3 is displaced so as to gradually converge to a desired angle while the angle between the cervical part 11 and the vertical axis is repeatedly swung so as to have an angle of about zero degree.

Subsequently, each part will be described. In the normal seating state, the head part 2 of the seating posture mannequin 1 is located above the chest part 3 and is connected to the chest part 3 by the cervical part 11. Further, the head part 2 is located in front of the headrest 93 when the seating posture mannequin 1 is in the normal seating state relative to the seat 90 having the headrest 93. The cervical part 11 is connected to the head part 2 of the present embodiment.

The cervical part 11 connects the head part 2 and the chest part 3. The cervical part 11 of the present embodiment is configured by placing a leaf spring 53 and the neck attaching angle adjustment mechanism 30 in series. The leaf spring 53 of the cervical part 11 is formed as follows. That is, the leaf spring 53 is capable of supporting the head part 2 when being extended in a vertical shape, while the leaf spring 53 is bent by the weight of the head part 2 when being tilted at an angle greater than a predetermined angle. One end of the leaf spring 53 is fixed to the head part 2 and the other end thereof is connected to the neck attaching angle adjustment mechanism. The neck attaching angle adjustment mechanism is adapted to adjust a direction in which the leaf spring 53 is fixed to the chest part 3. Therefore, the neck attaching angle adjustment mechanism 30 has a function of regulating and fixing a relative angle between the chest part 3 and the head part 2. Meanwhile, in the present embodiment, the gyro sensor as the detector 61 is fixed to the cervical part 11.

The neck attaching angle adjustment mechanism 30 includes a displacement member 32 connected to one end of the leaf spring 53 that is a component of the cervical part 11. Further, the leaf spring 53 and the neck attaching angle adjustment mechanism 30 are arranged in series between the head part 2 and the chest part 3. The displacement member 32 constituting the neck attaching angle adjustment mechanism 30 is rotatable about a rotation axis 33. The displacement member 32, which is rotated to a desired position, can be fixed by a displacement member fixing screw 31. Further, the displacement member 32 can be rotated by loosening the displacement member fixing screw 31. In this way, it is possible to adjust a connection angle between the chest part 3 and the head part 2.

The chest part 3 of the present embodiment is located above the pelvic part 4 in the normal seating state and is connected to the pelvic part 4 by the deformable lumbar part 12. Further, the chest part 3 is located so as to face the front side of the seat back 92 when the seating posture mannequin 1 is seated on the seat 90. The chest part 3 is connected to the neck attaching angle adjustment mechanism 30. The head comfortable state where the burden for supporting the head part of the seating person is minimized can be expressed by allowing the angle between the leaf spring 53 and the vertical axis to be close to zero degree. In order to achieve this state, the slope of the chest part 3 is adjusted. The inertia rotor 14 is attached to the chest part 3 of the present embodiment. Here, a center axis of the inertia rotor 14 is disposed so as to penetrate the center of the chest part 3.

The lumbar part 12 connected to the chest part 3 connects the chest part 3 and the pelvic part 4. The lumbar part 12 of the present embodiment is formed using an elastically deformable leaf spring. A leaf spring 55 forming the lumbar part 12 has an elastic force which is determined so as to substantially follow the shape of the vehicle seat 90 when the seating posture mannequin 1 is seated on the vehicle seat 90. Further, the leaf spring 55 used for the lumbar part 12 is configured so that the leaf spring 55 can support the part located above the chest part 3 when being in a predetermined shape.

The pelvic part 4 connected to the lumbar part 12 is closely fixed to one end side of the lumbar part 12 and is mainly located at the rear side on the seat cushion 91 in the normal seating state. The thigh part 5 is pivotably connected to the pelvic part 4.

The thigh part 5 connected to the pelvic part 4 is located on the seat cushion 91 so as to extend in a longitudinal direction in the normal seating state. A pivotable range of the thigh part 5 relative to the pelvic part 4 is restricted. In the present embodiment, an L-hip angle adjustment mechanism 40 capable of adjusting the pivotable range of the thigh part 5 is provided. Since the thigh part 5 can be pivoted only over the range set by the L-hip angle adjustment mechanism 40, it is possible to express the personal differences such as the bendability of the seating person.

The L-hip angle adjustment mechanism 40 of the present embodiment has a structure capable of adjusting the position of the end portion of the pelvic part 4 on the thigh part 5 side. Since the end portion of the thigh part 5 has a structure which is in contact with the end portion of the pelvic part 4, the contact position between the thigh part 5 and the pelvic part 4 is varied as the position of the end portion of the pelvic part 4 is changed. In this way, it is possible to set the pivotable angle range of the thigh part 5. Meanwhile, the setting the pivotable angle range of the thigh part 5 refers to setting the minimum relative angle between the thigh part 5 and the pelvic part 4.

The L-hip angle adjustment mechanism 40 includes a regulation member 41 provided at the end portion of the pelvic part 4 on the thigh part 5 side. The regulation member 41 has a structure which is provided by extending fan-shaped extension portions from both end portions of a contact plate 43 in a direction perpendicular to the contact plate 43. The pelvic part 4 is provided with a regulation member pivot shaft 44 penetrating the regulation member 41 (see FIG. 2). Meanwhile, various shapes such as the shape of the extension portion are not limited to the present embodiment.

After being pivoted to a desired position, the regulation member 41 pivotable about the regulation member pivot shaft 44 can be fixed by a regulation member fixing screw 42. The regulation member 41 can be pivoted by loosening the regulation member fixing screw 42.

Figure 2:
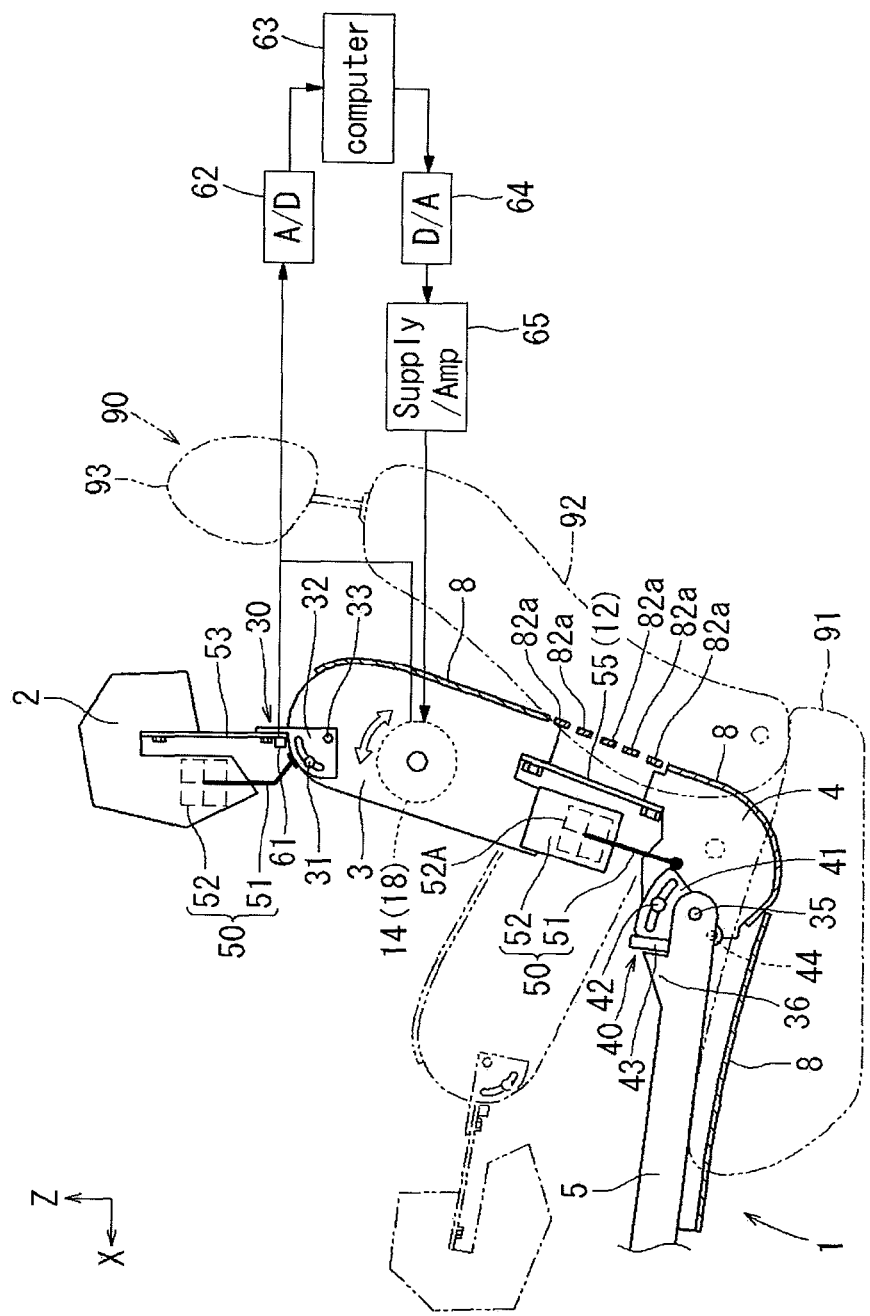
FIG. 2 is a side view of the seating posture mannequin.

The thigh part 5 of the present embodiment is pivotably attached to the pelvic part 4 by a pivot shaft 35. On the other hand, the thigh part 5 is provided with a locking portion 36 which comes into contact with the contact plate 43 to prevent the thigh part 5 from being further pivoted. As seen in FIG. 2, the further pivoting in the clockwise direction of the thigh part 5 is prevented. In this way, the pivot restriction in the so-called forward bending direction of the thigh part 5 to the pelvic part 4 can be adjusted. The thigh part 5 of the present embodiment is connected to the shin part 6.

The shin part 6 of the present embodiment is pivotably connected to the thigh part 5. The shin part 6 is mainly located in front of the seat cushion 91 in the normal seating state. The shin part 6 is connected to the foot part 7.

The foot part 7 of the present embodiment is pivotably connected to the shin part 6. The foot part 7 is located below the shin part 6 in the normal seating state.

Each of the chest part 3, the pelvic part 4, the thigh part 5 and the shin part 6 is equipped with a weight mount portion 71 for mounting a weight 70 and the weight 70 mounted on the weight mount portion 71. The weight of each part can be adjusted by replacing the weight 70.

As shown in FIG. 2, contact surface portions 8 are formed at the chest part 3, the lumbar part 12, the pelvic part 4 and the thigh part 5 of the seating posture mannequin 1. The contact surface portion 8 of the present embodiment is formed on a surface side where the seating posture mannequin 1 is in contact with the seat 90. The contact surface portion 8 is a portion which can come into contact with the seat 90 and transmit a force from the seat 90 to the seating posture mannequin 1.

As shown in FIG. 1, a chest part cover 81, a lumbar part cover 82, a pelvic part cover 83 and a thigh part cover 84 are provided as the contact surface portion 8 of the present embodiment. The chest part cover 81 is provided on the rear side (on the seat back 92 side at the time of seating) so as to cover the chest part 3. The lumbar part cover 82 is configured by five lumbar part cover components 82a and is provided continuously in the vertical direction on the rear side (on the seat back 92 side at the time of seating) so as to cover the lumbar part 12. The pelvic part cover 83 is provided on the rear side (on the seat back 92 side and/or the seat cushion 91 side at the time of seating) so as to cover the pelvic part 4. The thigh part cover 84 is provided on the lower side (the seat cushion 91 side at the time of seating) so as to cover the thigh part 5. Meanwhile, the number of the lumbar part cover components 82a is not limited to five.

However, it is desirable that two or more lumbar part cover components are provided so as to follow the curve of the lumbar part.

Since the periphery of the lumbar part 12 is curved, the lumbar part cover 82 is configured by combining a plurality of lumbar part cover components 82a. The lumbar part cover components 82a are configured by curving a plate to draw a substantially C-shaped arc and projecting a support rod (not shown) from the center of the arc-shaped plate. The lumbar part cover components 82a serve as a support member for the lumbar part 12.

FIG. 2 shows a state where a position confirmation unit 50 used for reading the displacement state of the leaf springs 53, 55 is provided in the seating posture mannequin 1. In the present embodiment, the position confirmation unit 50 is provided around the cervical part 11 and around the lumbar part 12.

The position confirmation unit 50 provided around the lumbar part 12 will be described as an example. The position confirmation unit 50 includes a rod-like body 51 provided to the pelvic part 4 and a position recognition unit 52 provided to the chest part 3. A grid-like evaluation display unit is provided to the position recognition unit 52. The evaluation display unit is used to read the evaluation contents, depending on the place of the evaluation display unit on which a leading end portion of the rod-like body 51 is located. By using the position confirmation unit 50, it is possible to understand a difference in the relative position between the chest part 3 and the pelvic part 4, and it is possible to understand the displacement state of the leaf spring 55 as the lumbar part 12.

Subsequently, a method of using the seating posture mannequin 1 of the present embodiment is described. In the present specification, a person having a specific neck attaching angle and a specific L-hip angle is set as an assumed seating person.

"First Using Method"

The angle of the neck attaching angle adjustment mechanism 30 and the angle of the L-hip angle adjustment mechanism 40 are set so as to express the property of the assumed seating person. The seating posture mannequin 1 in the above state is referred to as an "assumed seating person mannequin". The assumed seating person mannequin is seated on the seat 90 having the seat back 92. Further, a control setting is performed such that the angle of the chest part 3 of the assumed seating person mannequin can be adjusted by the slope adjustment device 18. After the adjustment of the slope of the chest part 3 is completed, the deformation state of the leaf spring 55 of the lumbar part 12 is confirmed. The deformation state of the leaf spring 55 of the lumbar part 12 is confirmed using the position confirmation unit 50 configured by the rod-like body 51 provided to the pelvic part 4 and the position recognition unit 52 provided to the chest part 3. The deformation state of the leaf spring 55 is confirmed by visually determining the place of the position recognition unit 52 on which the leading end portion of the rod-like body 51 is located. Simultaneously, respective information such as the seating pressure distribution is received.

After recording the respective information, in order to express the property of another assumed seating person different from the above assumed seating person, the angle of the neck attaching angle adjustment mechanism 30 and/or the angle of the L-hip angle adjustment mechanism 40 is set. Then, similar to the above method, another assumed seating person is seated on the seat 90. Further, after the adjustment of the slope of the chest part 3 is completed, respective information is confirmed and recorded.

After repeating the similar operation on the same seat 90, the similar operation is repeated on any other seat 90. At this time, it may be possible to record the information in the state where the function of adjusting the slope of the chest part 3 is stopped and the assumed seating person mannequin leans against the seat 90. The correspondence to the diversity of the neck attaching angle and the L-hip angle of each seat 90 is collectively determined based on the respective information.

"Second Using Method"

The angle of the neck attaching angle adjustment mechanism 30 and the angle of the L-hip angle adjustment mechanism 40 are set so as to express the property of a specific assumed seating person. The assumed seating person mannequin that is the seating posture mannequin 1 set as described above is seated on the seat 90 having the seat back 92 and the headrest 93. A control setting is performed such that the angle of the chest part 3 of the assumed seating person mannequin can be adjusted by the slope adjustment device 18.

The assumed seating person mannequin is configured so as to be capable of reproducing the same weight as the human body. Therefore, by the stress relaxation due to the seat cushion 91 or the like, the posture of the assumed seating person mannequin is gradually changed over time. The value of current or voltage or the like required for maintaining the posture of the assumed seating person mannequin in a predetermined state is recorded. These values are used as an index for evaluating the burden of the seating person. For example, when the control amount required for maintaining the posture of the seat is smaller than other seat 90, the seat 90 can be determined as a seat having excellent ability to support an occupant.

"Third Using Method"

The angle of the neck attaching angle adjustment mechanism 30 is set so as to express the property of a specific assumed seating person. The assumed seating person mannequin that is the seating posture mannequin 1 set as described above is seated on the seat 90 having the seat back 92 and the headrest 93. A control setting is performed such that the angle of the chest part 3 of the assumed seating person mannequin can be adjusted by the slope adjustment device 18.

Vibration of a vehicle is reproduced to vibrate the seat 90. Then, due to the vibration, it becomes difficult for the assumed seating person mannequin to maintain the posture. The value of current or the like required for maintaining the posture of the assumed seating person mannequin in a predetermined state is recorded and used as an index for evaluating the burden of the seating person. Similar to the second using method, when the control amount required for maintaining the posture of the seat is smaller than other seat 90, the seat 90 can be determined as a seat having excellent ability to support an occupant.

The seating posture mannequin 1 of the present embodiment is configured to be used for evaluating the seat 90 and includes the pelvic part 4 configured to be placed on the seat cushion 91. Further, the seating posture mannequin 1 includes the chest part 3 configured to be disposed at a position facing the seat back 92. A relative position between the pelvic part 4 and the chest part 3 can be changed. Further, the seating posture mannequin 1 includes the slope adjustment device 18 configure to change the slope of the chest part 3. Furthermore, the seating posture mannequin 1 includes the processing device 63 for controlling the slope adjustment device 18 by using the result detected by the detector 61. Accordingly, it is possible to take a posture where the chest part 3 does not lean against the seat back 92. As a result, it is possible to increase the diversity of the seating posture that can be expressed by a single seating posture mannequin 1.

Further, the physical quantity (a seating position, an angle of each part of a human body, a curvature of a lumbar spine, an eye point, a deflected shape of the seat 90, a seating pressure distribution, etc.) relating to the seating feeling in various seating postures can be measured. In addition, even when the balance of the seating posture is lost due to the vibration inputted to the seat 90 or the like, the seating posture mannequin 1 can move so as to regain the balance. Therefore, for example, in the case where the posture is changed due to the vibration, it is possible to measure the variation in the seating state information. Further, even when, due to the stress relaxation or the like, the support form by the seat 90 is changed in accordance with the seating time, it is possible to measure the change in the seating state information corresponding thereto.

The seating posture mannequin 1 of the present embodiment includes the head part 2 and the cervical part 11 connecting the head part 2 and the chest part 3. Further, the processing device 63 is configured to control the slope adjustment device 18 such that the cervical part 11 is substantially parallel to the vertical axis. Therefore, it is possible to reproduce the behavior of trying to take a posture where the burden for supporting the head part 2 is suppressed (head comfortable state). In this way, the control amount required for maintaining the head comfortable state can be measured. Further, the control amount can be used as an index of the comfort of the seat 90.

By using the seating posture mannequin 1 of the present embodiment, it is possible to obtain the information for evaluating the seat 90. More specifically, a method of the present embodiment is a method for obtaining the information for evaluating the seat 90 by seating the seating posture mannequin 1, in which the pelvic part 4 and the chest part 3 are relatively movably connected to each other is seated, on the seat 90. At this time, the calculation can be performed by using the results detected by the detector 61, the slope of the chest part 3 of the seating posture mannequin 1 can be adjusted by controlling the slope adjustment device 18 based on the results of the calculation, and the information for evaluating the seat 90 can be obtained. Therefore, it is possible to obtain the information in the seating posture, which cannot be obtained in the related art. As a result, it is possible to perform the evaluation of the seat 90, which cannot be performed in the related art.

In the case of the present embodiment, it is possible to stop the operation of the slope adjustment device 18 when the detection results of the gyro sensor fall within a predetermined range. At this time, the slope adjustment device 18 is in the state where a force for moving the chest part 3 is not operated thereto. That is, the slope adjustment device 18 does not fix the posture, but generates a force to adjust the slope of the chest part 3 when necessary. More specifically, the slope of the chest part 3 is adjusted by adjusting a biasing force applied to the chest part 3. Therefore, even when a force is generated by the slope adjustment device 18, the posture that can be taken is changed due to the factors such as the shape of the seat 90. As a result, it is possible to easily express the relationship between the seat 90 and the seating posture.

The seating posture mannequin 1 of the present embodiment can be switched between a case where the function of adjusting the slope of the chest part 3 works and a case where the function does not work. Therefore, it is possible to express a number of characteristics by a single seating posture mannequin 1.

The seating posture mannequin 1 can be formed in various aspects other than the above embodiments. Hereinafter, an example thereof is described with reference to the drawings.

First Modified Example

Figure 3:
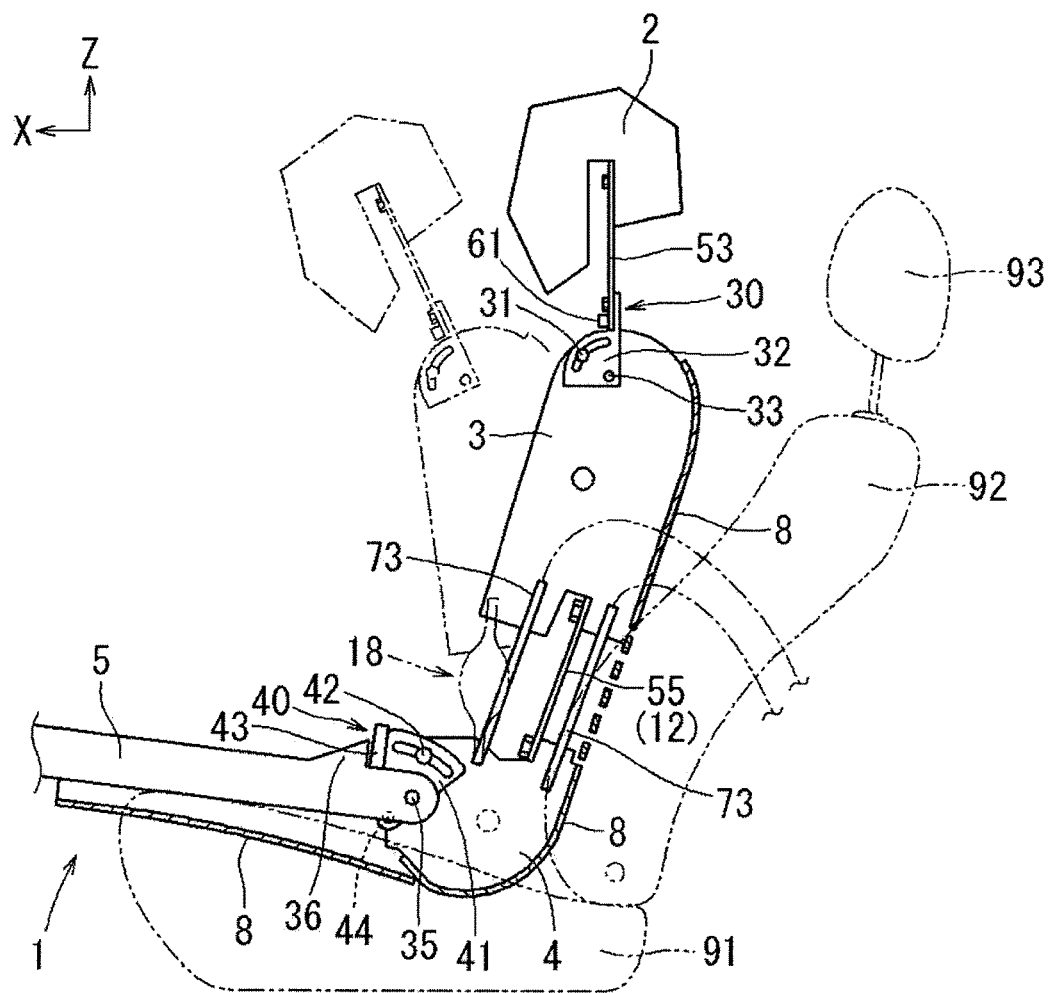
FIG. 3 is a side view of a seating posture mannequin according to a first modified example.

The slope adjustment device 18 for adjusting the slope of the chest part 3 is not limited to the aspect using the inertia rotor 14, as in the above embodiments. The slope adjustment device 18 may be intended to adjust a force for pulling the chest part 3. For example, as in a first modified example shown in FIG. 3, it is conceivable to employ a structure that a tube 73 through which fluid can enter or exit is provided in front of and at the rear of the lumbar part 12. In this case, the tube 73 is fixed at a predetermined portion between the chest part 3 and the pelvic part 4.

In the case of the first modified example, the tube 73 can be inflated when fluid such as compressed air is introduced into the tube 73 by operating an electromagnetic valve (not shown). A force for allowing the chest part 3 and the pelvic part 4 to be close to each other can be generated when the tube 73 is inflated. For example, the slope of the chest part 3 can be changed by introducing the fluid only into the tube 73 located in front of the lumbar part 12, as indicated by a two-dot chain line in FIG. 3. The magnitude of the force for pulling the chest part 3 can be adjusted by adjusting the introducing amount of the fluid into the tube 73. On the contrary, the force can be released or reduced when the fluid is discharged from the inflated tube 73. By adjusting the tube 73 for introducing the fluid or the introducing amount thereof in this way, it is possible to adjust the slope of the chest part 3.

Second Modified Example

Figure 4:
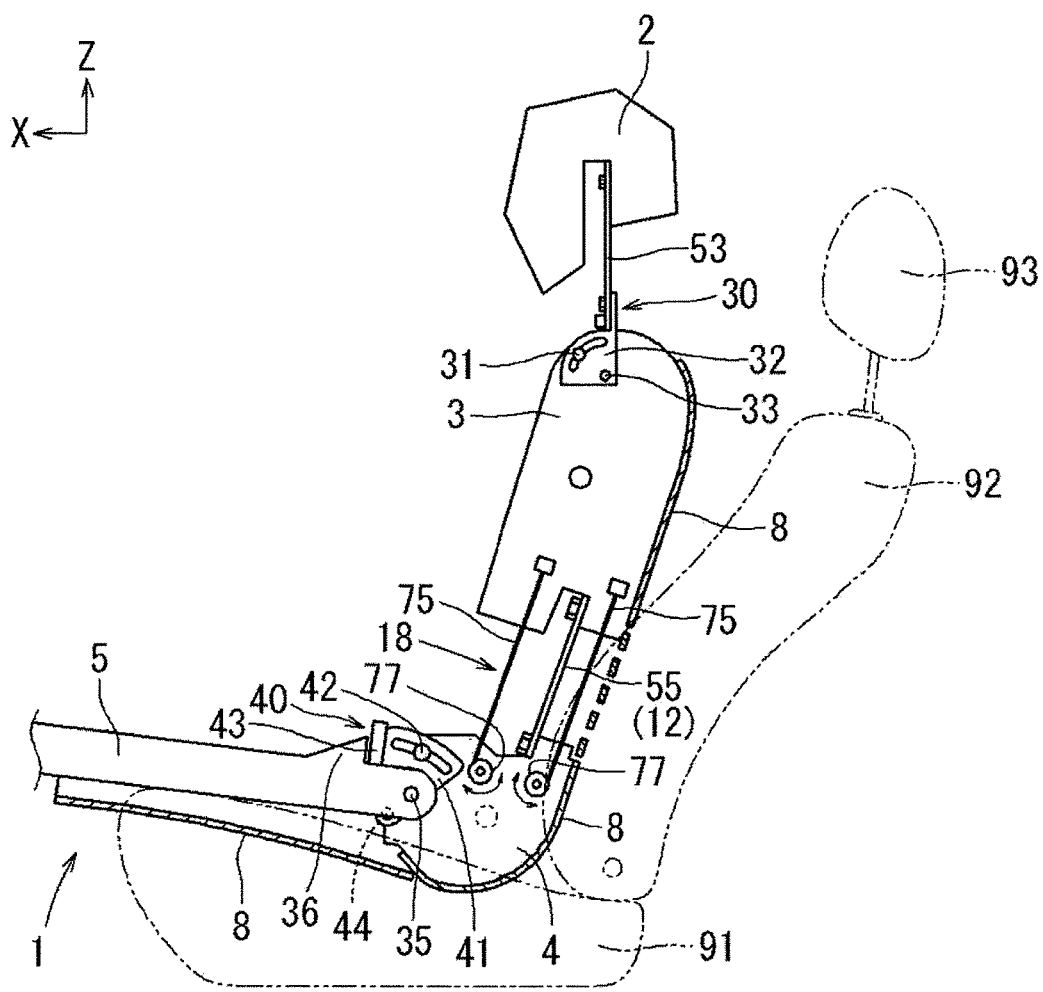
FIG. 4 is a side view of a seating posture mannequin according to a second modified example.

Unlike the first modified example, the force for allowing the chest part 3 and the pelvic part 4 to be close to each other may be generated by winding a string-like material or band-like material connected to the chest part 3 and the pelvic part 4. For example, as in a second modified example shown in FIG. 4, one end of a string-like material 75 may be connected to the chest part 3 and the other end of the string-like material 75 may be connected to a roller 77 connected to the pelvic part 4. In this case, by selecting the string-like material 75 to be wound and adjusting the winding amount of the string-like material 75, the force for pulling the chest part 3 can be adjusted, and hence, the slope of the chest part 3 can be adjusted.

Hereinabove, the illustrative embodiment has been described with reference to one embodiment and two modified examples. However, the present invention may be implemented in various forms other than the above illustrative embodiment. For example, the processing means is not necessarily provided on the outside of the seating posture mannequin. The processing means may be provided on the inside of the seating posture mannequin.

Further, the detector is not necessarily provided in the seating posture mannequin. For example, the detector may be provided separately from the seating posture mannequin such that the state of the predetermined portion of the seating posture mannequin can be detected.

As the detector, not the gyro sensor but other detection device capable of detecting an angle or an angular velocity may be employed. Further, the detector may detect a position or the like, instead of an angle or an angular velocity. These detectors may be used alone or in combination.

All parts of the rigid body are not necessarily required in the seating posture mannequin. The foot part or the shin part may be omitted. Further, it is not essential that each part such as the head part or the chest part has a shape imitating a human body. It is sufficient if the parts can express the seating state.

The head comfortable state can be expressed even without providing the head part or the cervical part. The reason is that the head comfortable state can be naturally expressed when the chest part is set to a predetermined angle. However, in the case where the cervical part or the head part is provided, the burden of the cervical part can be expressed in a case where the slope of the chest part is not controlled. Accordingly, it is possible to widen the utilization range of the seating posture mannequin. Here, the chest part and the head part may be rigidly coupled. Also in this case, the slope of the chest part can be used as an index of the head comfortable state of a predetermined assumed seating person.

The L-hip angle adjustment mechanism may be provided to the thigh part, instead of the pelvic part. Further, the pivot shafts of the thigh part and the pelvic part may be used as the regulation member pivot shaft, or, each pivot shaft may be separately provided.

When grasping the displacement state of the spring member such as the leaf spring, it is not necessary to visually read the relative position between the rod-like body and the position recognition unit. For example, a signal from a transmitting unit provided in the rod-like body may be electrically read by a receiving unit provided in the position recognition unit, and the data read may be automatically recorded.

It is not necessary to set the predetermined angle to be maintained to a single defined angle. The predetermined angle can be set to have an angle range such as an angle of ±3 degree. Further, the range for allowing the deviation and the range to be converged are not necessarily consistent with each other. For example, when the angle is considered to be deviated from the range of ±3 degree, the angle may be controlled to fall within the range of ±2 degree.

It is not necessary to set both the neck attaching angle and the L-hip angle. The seating posture mannequin where either of the neck attaching angle and the L-hip angle is set may be used as the assumed seating person mannequin.

It is not essential that the pelvic part and the thigh part are connected to each other via the pivot shaft. A connection part may be provided between the pelvic part and the thigh part, and the pelvic part and/or the thigh part may be pivoted relative to the connection part.

Not only the case where the slope of the chest part is directly changed but also the case where the slope of the chest part is indirectly changed corresponds to the state where the slope of the chest part is controlled. For example, the slope of the chest part can be adjusted by moving the neck part or the head part so as to adjust the slope thereof. This case corresponds to the state mentioned in the present specification, i.e., the state where the slope of the chest part is controlled.

In the above embodiment or the modified examples, an arm part or the like is not attached to the chest part. However, the arm parts may be attached to both sides of the chest part. However, since the purpose of providing the seating posture mannequin is not to simulate a human body, it is preferable to configure the seating posture mannequin as simple as possible.

Further, the vehicle is not limited to a car, but may include vehicles flying through the air, such as airplanes or helicopters, and vehicles moving on the sea level or in the sea, such as ships and submarines. Further, the seating posture mannequin may be used in other components on which the seating posture mannequin can be seated, such as a chair used in furniture, in addition to the vehicle seat.

What is claimed is:

1. A seating posture mannequin configured to be used for evaluating a seat, the seating posture mannequin comprising:
   a pelvic part configured to be placed on a seat cushion;
   a chest part configured to be disposed at a position facing a seat back, wherein a relative position between the chest part and the pelvic part can be changed;
   a slope adjustment device configured to change a slope of the chest part; and
   a processing device configured to control the slope adjustment device by using a result detected by a detector, wherein
   at least a portion of the slope adjustment device is provided within at least one of the pelvic part and the chest part so as to apply a force within the at least one of the pelvic part and the chest part to change the slope of the chest part, and
   the slope adjustment device comprises an inertia rotor that is provided within the chest part.

2. The seating posture mannequin according to claim 1, further comprising:
   a head part; and
   a cervical part connecting the head part and the chest part, wherein
   the processing device is configured to control the slope adjustment device such that the cervical part is substantially parallel to a vertical axis.

3. A method for obtaining information for evaluating a seat by seating a seating posture mannequin, in which a pelvic part and a chest part are relatively movably connected to each other, on the seat, the method comprising:
   performing calculation by using a result detected by a detector;
   adjusting a slope of the chest part of the seating posture mannequin by controlling a slope adjuster, which is provided at least partially within at least one of the pelvic part and the chest part, to apply a force within the at least one of the pelvic part and the chest part based on the result of the calculation; and
   obtaining the information for evaluating the seat,
   wherein the slope adjuster comprises an inertia rotor that is provided within the chest part.

4. The seating posture mannequin according to claim 2, wherein
   the cervical part is a deformable elastic body.

5. A seating posture mannequin configured to be used for evaluating a seat, the seating posture mannequin comprising:
   a pelvic part configured to be placed on a seat cushion;
   a chest part configured to be disposed at a position facing a seat back, wherein a relative position between the chest part and the pelvic part can be changed;
   a slope adjustment device configured to change a slope of the chest part; and
   a processing device configured to control the slope adjustment device by using a result detected by a detector, wherein
   at least a portion of the slope adjustment device is provided within at least one of the pelvic part and the chest part so as to apply a force within the at least one of the pelvic part and the chest part to change the slope of the chest part, and
   the slope adjustment device comprises an inflatable tube that is connected to and arranged between the chest part and the pelvic part.

6. A seating posture mannequin configured to be used for evaluating a seat, the seating posture mannequin comprising:
   a pelvic part configured to be placed on a seat cushion;
   a chest part configured to be disposed at a position facing a seat back, wherein a relative position between the chest part and the pelvic part can be changed;
   a slope adjustment device configured to change a slope of the chest part; and
   a processing device configured to control the slope adjustment device by using a result detected by a detector, wherein
   at least a portion of the slope adjustment device is provided within at least one of the pelvic part and the chest part so as to apply a force within the at least one of the pelvic part and the chest part to change the slope of the chest part, and
   the slope adjustment device comprises:
      a band that is connect to and arranged between the chest part and the pelvic part; and
      a roller that is connected to the band and that is configured to selectively adjust a length of the band that extends between the chest part and the pelvic part.

7. A method for obtaining information for evaluating a seat by seating a seating posture mannequin, in which a pelvic part and a chest part are relatively movably connected to each other, on the seat, the method comprising:
   performing calculation by using a result detected by a detector;
   adjusting a slope of the chest part of the seating posture mannequin by controlling a slope adjuster, which is provided at least partially within at least one of the pelvic part and the chest part, to apply a force within the at least one of the pelvic part and the chest part based on the result of the calculation; and
   obtaining the information for evaluating the seat,
   wherein the slope adjuster comprises an inflatable tube that is connected to and arranged between the chest part and the pelvic part.

8. A method for obtaining information for evaluating a seat by seating a seating posture mannequin, in which a pelvic part and a chest part are relatively movably connected to each other, on the seat, the method comprising:
   performing calculation by using a result detected by a detector;
   adjusting a slope of the chest part of the seating posture mannequin by controlling a slope adjuster, which is provided at least partially within at least one of the pelvic part and the chest part, to apply a force within the at least one of the pelvic part and the chest part based on the result of the calculation; and
   obtaining the information for evaluating the seat,
   wherein the slope adjuster comprises:
      a band that is connect to and arranged between the chest part and the pelvic part; and a roller that is connected to the band and that is configured to selectively adjust a length of the band that extends between the chest part and the pelvic part.

* * * * *